Figure 1:
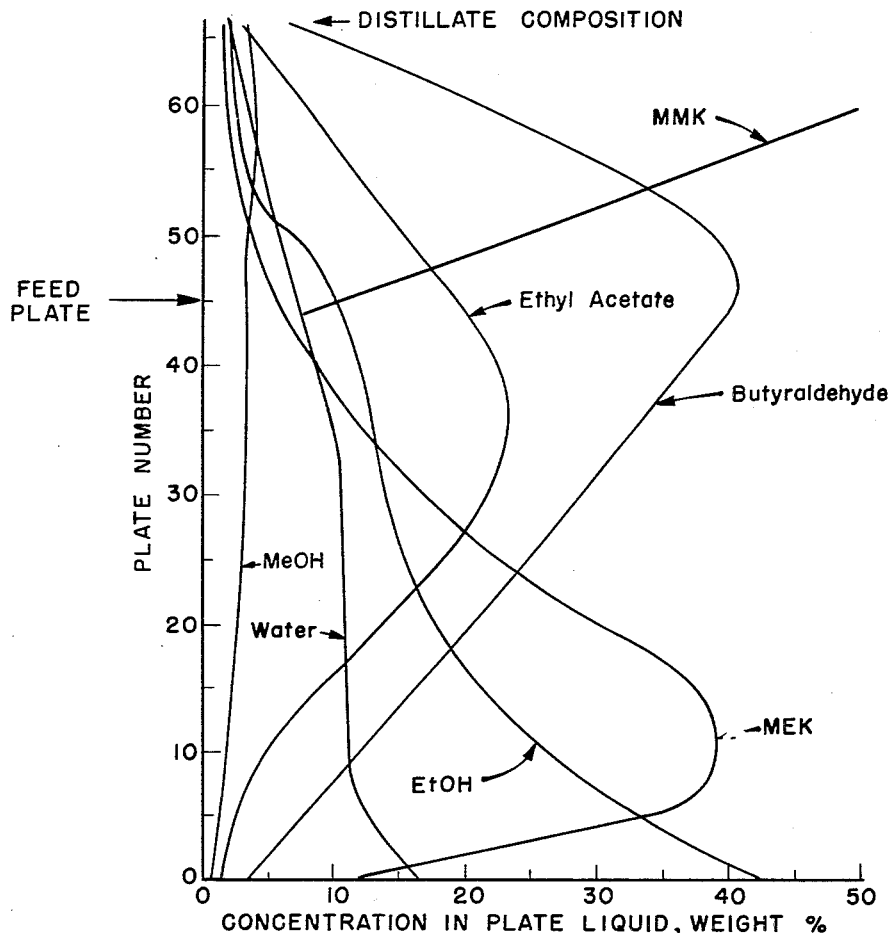

INVENTOR.
JOE C. WEAVER, JR.

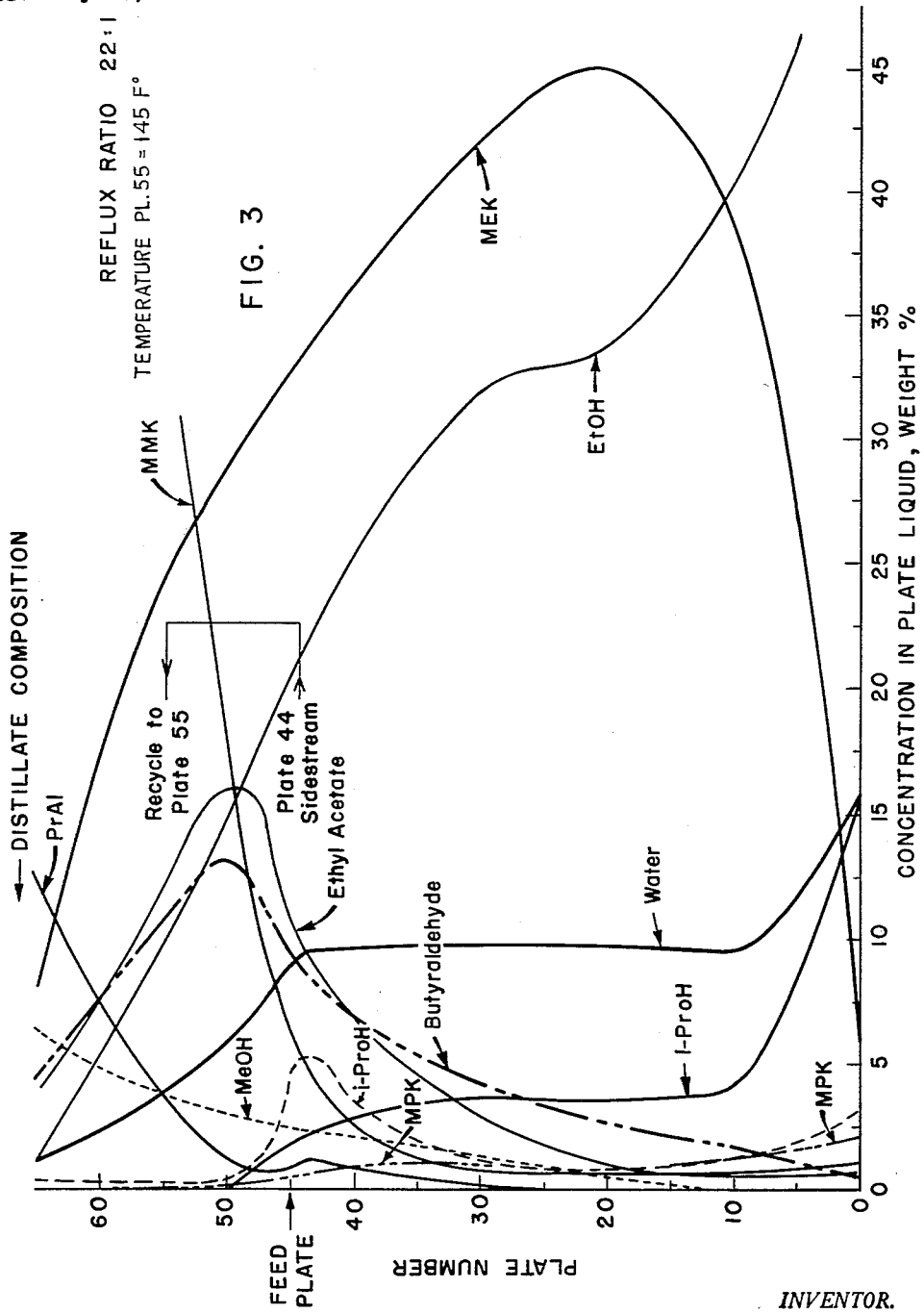

2,715,604

RECOVERY OF PURE ETHANOL FROM HYDROCARBON SYNTHESIS PRODUCT

Joe C. Weaver, Jr., Brownsville, Tex., assignor to Stanolind Oil and Gas Company, Tulsa, Okla., a corporation of Delaware Application May 10, 1954, Serial No. 428,527

6 Claims. (Cl. 202—39)

My invention relates to a novel method for the separation of various oxygenated organic compounds from one another. More particularly, it pertains to a process for recovering ethanol in highly purified form from aqueous mixtures containing methanol.

While mixtures of the type contemplated by my invention may be found to exist as product streams from other industrial operations, the process of my invention is directed principally to certain fractions of the primary water-soluble chemicals streams produced in hydrocarbon synthesis involving the reduction of carbon monoxide with hydrogen in the presence of a fluidized iron catalyst. In the hydrocarbon synthesis plants now designed for commercial purposes, having capacities of the order of about 6,000 barrels of liquid hydrocarbons per day, the nonacid chemicals present in the aqueous mixtures produced constitute about 75 per cent of the total water-soluble chemicals formed, or about 320,000 pounds per day. Accordingly, for economical and other reasons, it is essential that those chemicals be recovered each in as highly purified form as possible.

A mixture typical of those with which we are concerned and the relative concentration in which each component thereof is present are indicated below:

TABLE I

| Compound | Weight Percent | Boiling Point, °C. |
|---|---|---|
| Propionaldehyde | 3.1 | 48.2 |
| Acetone | 14.6 | 56.2 |
| Methanol | 1.0 | 64.5 |
| Butyraldehyde | 1.4 | 74.8 |
| Ethyl Acetate | 1.3 | 77.2 |
| Ethanol | 37.3 | 78.3 |
| Methyl Ethyl Ketone | 5.7 | 79.6 |
| Isopropanol | 2.1 | 82.3 |
| 1-Propanol | 15.2 | 97.2 |
| Secondary Butanol | 2.5 | 99.5 |
| Methyl Propyl Ketone | 1.9 | 102.0 |
| Water | 13.9 | 100.0 |

In recovering a mixture such as that specifically described immediately above, the primary water produced in hydrocarbon synthesis was first subjected to a fractional distillation step to separate the oxygenated chemicals in two groups, the alcohols, aldehydes, and ketones being taken off overhead, and the acids being removed in aqueous solution from the bottom of the still. The overhead thus obtained generally contains from about 15 to 20 weight per cent water. This fraction was next distilled to take overhead the 1-propanol and lower boiling compounds, and 1-butanol and heavier compounds were withdrawn as a bottom stream. After removing acetaldehyde from the last-mentioned overhead, a mixture having the typical composition given in Table I was obtained. The latter was next subjected to a fractionation step designed to take overhead A-6 as distillate methanol and lighter materials, such as acetone, propionaldehyde, etc., leaving the butyraldehyde, ethanol, and heavier fraction as bottoms. Because of the relatively high proportion of acetone to methanol in the feed to the aforesaid distillation step, it was expected that all of the methanol would be removed with the acetone in the form of an azeotrope boiling at 55.7° C. With the type of mixtures involved, however, it was found in actual practice that the removal of methanol in the expected fashion was impossible to accomplish in columns designed for commercial operation. This I have found to be true regardless of the fact that acetone is present in a concentration of from about ten to twenty times greater than that of the methanol, notwithstanding the additional fact that an acetone-methanol ratio of only 7.3:1 is required to satisfy the acetone-methanol azeotrope. Thus, while the key azeotropic systems involved in such a separation, i. e., acetone-methanol (B. P. 55.7° C.) and ethanol-butyraldehyde-water (B. P. 67.2° C.), boil approximately ten degrees apart, it was found that with mixtures of the type discussed above, appreciable quantities of methanol passed into the bottoms along with the butyraldehyde, ethanol, and higher boiling products.

The last-mentioned bottoms fraction referred to above was then subjected to a further distillation operation in which the ethanol and lighter components were taken overhead and the 1-propanol and heavier compounds were removed as bottoms. The expression "ethanol and lighter components" as used herein is intended to refer to components which form lower boiling azeotropes with ethanol and/or water. The overhead containing ethanol was next subjected to a fractional distillation step in which distillation was effected in the presence of a high concentration of water in the distillation zone. Ethanol under such conditions passes into the bottoms, and the latter thereafter is again subjected to fractionation to obtain product ethanol. Ethanol produced in this manner, however, contained methanol in concentrations as high as about 1 weight per cent, whereas specifications for spirit grade ethanol permit not more than about .04 weight per cent of methanol. Not only is there found an excessive amount of methanol in the bottoms, but a substantial proportion of the butyraldehyde and ethyl acetate present is taken overhead. Also, some methyl ethyl ketone, when present, appears in the distillate and tends to concentrate in the product acetone when it is subsequently attempted to isolate the latter, thus rendering it difficult for the acetone to meet boiling range specifications.

Although ordinarily it is a relatively simple task to separate methanol from ethanol, I have found with mixtures of the type contemplated that such a step is extremely difficult to accomplish, while at the same time causing the bulk of the compounds such as butyraldehyde, methyl ethyl ketone, ethyl acetate, and similar materials to remain in the bottoms with the ethanol. Accordingly, it is to this object, i. e., removing methanol overhead while retaining the major portions of the butyraldehyde and/or the aforesaid ketone, ester, and similar compounds in the bottoms with the ethanol, that the process of my present invention is primarily directed.

Figure 2:
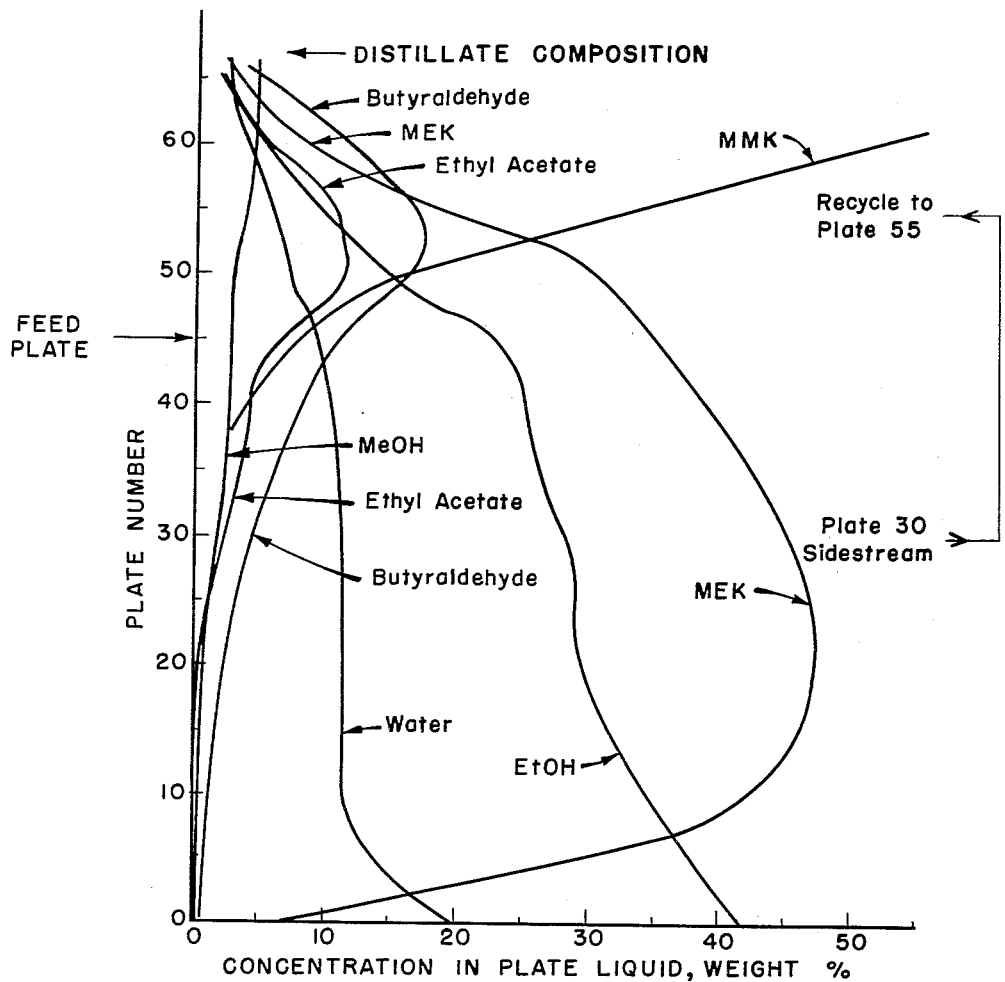

I have now discovered that spirit grade ethanol can be secured from mixtures of the type herein described by subjecting said mixtures to distillation and effecting an internal recycle of a portion of the column contents during the distillation step by withdrawing a stream from the column in the vicinity of the feed tray and returning said stream to the rectification zone thereof at a point above the side stream withdrawal. The expression "in the vicinity of the feed tray" used in the present description and claims is intended to be construed as a range covering from about plate 15 below the feed tray to about plate 10 above said tray. Generally, however, with mixtures of the type contemplated, I prefer to withdraw the side stream at about the fifth plate below and return it to about the fifth plate above the feed tray. Ordinarily, the level at which withdrawal of the side stream is taken from the column is determined by establishing the region within the column wherein the butyraldehyde content would be at or near a maximum if no side stream were being removed, as is true in the case of conventional separation. This region is clearly shown in Figure 1, the curves of which are based on actual operation under conditions outlined in Example 1 below. As shown by Figure 1, the point of peak butyraldehyde concentration is near the feed tray. This concentration may range from about 25 to about 60 per cent. If, however, a side stream is removed, for example, in an amount equal to about 5 per cent of the reflux from a region in the vicinity of the feed plate, as provided by the present invention, the peak concentration of butyraldehyde is shifted to a point higher in the column. Such peak concentration will be found to be at or near the point of recycle return as shown in Figure 2, the curves of which are based on actual operating conditions employed in Example 2 described below. In operations of the latter type, it will be noted that the peak concentration of butyraldehyde is significantly lower than that occurring in conventional operations and that the concentration of butyraldehyde at or near the feed plate is only about 10 per cent. This shift in butyraldehyde concentration coincides with an increase in methyl ethyl ketone concentration occurring over about two-thirds of the column. Since the water gradient in the column is essentially the same in both conventional procedures and in the process of my invention, as shown by Figures 1 and 2, respectively, it appears that the improved separation of methanol from ethanol secured by the present invention is due to a substantial reduction of the butyraldehyde concentration in the column and due to replacement by methyl ethyl ketone. In this regard, it might be pointed out that in conventional operation, two liquid phases have been shown to exist on certain trays in the "critical region," i. e., in the region of high butyraldehyde concentration. In accordance with the process of the present invention, however, butyraldehyde, the least soluble component of the basic mixture, is materially reduced in concentration and the concentration of the more soluble methyl ethyl ketone is increased thereby, resulting in a decreased tendency toward the formation of two phases. This change in phase relationship is believed to be related to the improved separation of methanol from ethanol secured under the conditions taught herein.

In order to illustrate further the flexibility of the conditions of separation of the present invention with respect to the point in the column at which the aforesaid side stream may be taken, reference is made to Figure 3. The feed used in obtaining the data shown in Figure 3 was comparable in composition to that employed in Example 2 below. Other essential conditions of operation employed in securing these data appear on Figure 3 itself.

With further reference to the point of recycle return, such point should be at a location where significant reduction in both water and alcohol concentration has occurred, but where sufficient plates still exist to effect the necessary reduction in concentration of butyraldehyde and methyl ethyl ketone, if the latter is present, in the distillate. In this connection, I would like to stress that while there likewise exists a substantially optimum point in the rectification section to which the aforesaid stream is most advantageously returned, the delivery of said stream to substantially any point in the rectification zone other than the very top section thereof will provide improved results because the concentration of both alcohols and water throughout said rectification zone is much less than is to be found at any point in the stripping zone. Under such circumstances, favorable conditions are provided within the column for effecting satisfactory separation of methanol from ethanol, butyraldehyde, and other components boiling higher than methanol.

Generally speaking, the stream withdrawn from the stripping zone is preferably returned to a point in the rectification zone where the concentration of at least one of the compounds, butyraldehyde and methyl ethyl ketone, ranges from about 10 to about 20 per cent. The level of internal recycle return, however, I have found to be inseparably dependent on the temperature maintained at said level. For example, in the case of a feed having the composition indicated in Table VI, in order to prevent objectionable amounts of methanol from passing into the bottoms, it is desirable to employ a temperature at said level ranging from about 144° to about 150° F. Feeds having this general composition will likewise require temperatures at the point of recycle return which lie within the aforesaid range. Under these conditions, practically all of the methanol passes overhead together with relatively minor amounts of butyraldehyde, methyl ethyl ketone, and/or ethyl acetate.

The extent to which this internal recycle step is carried out, in accordance with my invention, may vary rather widely. However, the quantity of liquid withdrawn from the stripping zone should not ordinarily exceed about 10 per cent of the liquid rate therein and preferably should amount to about 5 per cent thereof.

The advantages of the process of my invention over conventional methods for effecting the desired separation are further illustrated in the following examples, the first of which sets forth the procedure and results secured by the use of conventional distillation technique.

*Example 1*

Into a distillation column eight feet in diameter and sixty-one feet high and having 65 actual plates, a feed having the following composition was introduced at the 45th plate of the column.

TABLE II

| Component: | Weight per cent |
|---|---|
| Methyl butyl ketone | 0.95 |
| Methyl propyl ketone | 2.07 |
| Methyl ethyl ketone | 7.36 |
| Diethyl ketone | 0.61 |
| Acetone | 17.21 |
| Butyraldehyde | 3.21 |
| Propionaldehyde | 4.62 |
| 1-butanol | 0.16 |
| Isobutyl alcohol | 0.10 |
| 1-propanol | 14.13 |
| Isopropyl alcohol | 2.98 |
| Ethanol | 28.66 |
| Methanol | 1.24 |
| Ethyl acetate | 1.34 |
| Water | 15.31 |

Conditions under which separation of methanol and lighter boiling components from ethanol and higher compounds was attempted are listed below.

TABLE III

| Flow rates: | Pounds per hour |
|---|---|
| Feed | 2,750 |
| Distillate | 750 |
| Bottoms | 2,000 |
| Reflux | 19,400 |
| Temperatures: | Degrees, F. |
| Top | 133 |
| Plate 47 | 155 |
| Plate 41 | 159.5 |
| Base | 179.5 |
| Miscellaneous: | |
| Reflux return plate | 65 |
| Feed plate | 45 |
| Reflux ratio | 26 |

Operating the column under the above conditions, the following concentrations of components were found throughout the column, in the distillate, and in the bottoms.

TABLE IV

| Component, Weight Percent | Distillate | Bottoms | Plate 10 | Plate 20 | Plate 30 | Plate 44 | Plate 54 |
| --- | --- | --- | --- | --- | --- | --- | --- |
| Methyl butyl ketone | | 1.33 | 0.72 | 0.70 | 0.68 | 0.66 | 0.33 |
| Methyl propyl ketone | | 2.62 | 0.76 | 0.44 | 0.25 | 0.12 | |
| Methyl ethyl ketone | 1.34 | 10.12 | 38.82 | 29.38 | 16.44 | 5.90 | 2.43 |
| Diethyl ketone | | 0.97 | 0.62 | 0.41 | 0.43 | 0.24 | |
| Acetone | 65.53 | | | | | 8.23 | 35.70 |
| Butyraldehyde | 5.80 | 3.18 | 11.89 | 20.62 | 28.68 | 39.99 | 32.12 |
| Propionaldehyde | 18.22 | | | 0.32 | 0.64 | 2.62 | 5.17 |
| 1-Butanol | | 0.21 | 0.04 | 0.15 | 0.71 | 0.69 | 0.71 |
| Isobutyl alcohol | | 0.12 | 0.04 | 0.07 | 0.07 | 0.02 | 0.12 |
| 1-Propanol | | 17.06 | 2.77 | 2.61 | 2.51 | 1.06 | |
| Isopropyl alcohol | | 14.10 | 1.68 | 1.22 | 1.09 | 0.68 | |
| Ethanol | 1.79 | 42.02 | 25.60 | 17.41 | 13.73 | 10.12 | 3.31 |
| Methanol | 2.99 | 0.45 | 1.23 | 2.32 | 3.04 | 3.00 | 3.60 |
| Ethyl acetate | 2.46 | 1.28 | 4.50 | 13.59 | 21.50 | 19.60 | 11.90 |
| Water | 1.87 | 16.54 | 10.84 | 10.51 | 10.19 | 6.95 | 4.41 |

From the methanol concentration found in the bottoms stream, as indicated by the data immediately above, it is evident that specification ethanol cannot be made therefrom because such concentration is approximately eleven times that permitted. The foregoing results clearly show that the desired separation of methanol from ethanol and higher boiling components cannot necessarily be effected by taking large quantities of higher boiling chemicals into the distillate. Also, other experiments have indicated that the use of high reflux ratios, for example 71:1, under conditions otherwise similar to those recited in the above example are ineffective.

The low average relative volatilities of methanol to ethanol are attributed to the high concentration of water and/or butyraldehyde on the trays. However, based on extensive tests, it has been shown that a good separation is always obtained when the butyraldehyde content in the region in which the side draw is made is held at a significantly reduced value, this value generally being in the range of from about 5 to about 15 per cent.

With further reference to Figure 1, the concentration gradients indicate that the relatively water-soluble chemicals have high peak concentrations at various points in the column. Thus in the case of methyl ethyl ketone, the region of peak concentration is found to be plate 10. With ethyl acetate, it lies between plates 29 and 40, and for butyraldehyde it is between plates 40 and 50. These regions of peak concentrations are displaced up the column when the percentage of these components taken into the distillate is increased, also, operation at higher reflux ratios gives higher concentrations of these chemicals on the trays. Water concentration on the trays is seen to remain relatively constant in the stripping section because the water azeotropes of butyraldehyde, ethyl acetate, and methyl ethyl ketone have nearly the same water content. As a result of the discovery that such concentration gradients exist, internal recycle of a side stream from the stripping zone containing a high concentration of minor components (butyraldehyde, methyl ethyl ketone, and/or ethyl acetate) to the rectification zone, as taught by the present invention, provides a means for effecting a highly satisfactory separation of methanol from ethanol in mixtures of the aforesaid type.

The effectiveness of internal recycle in producing an ethanol containing stream substantially free from methanol is illustrated by the example which follows.

*Example 2*

Figure 4:
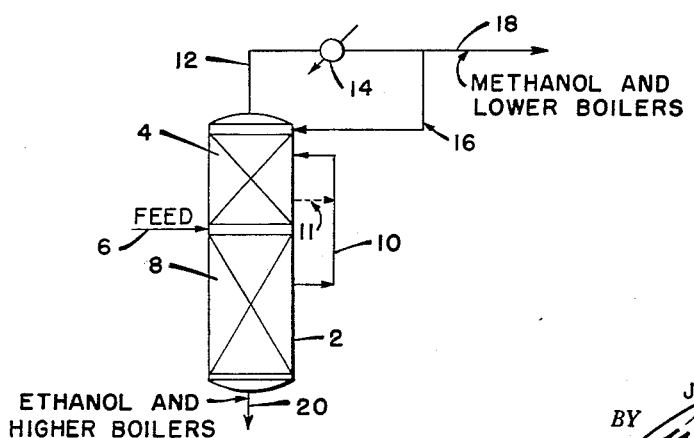

Referring to Figure 4, column 2 is equipped for fractional distillation with liquid-vapor phase contacting means in a rectifying zone 4 above the inlet of feed line 6 and in a stripping section 8 below the feed plate. The column has 65 actual plates and the feed is introduced at plate No. 45. The feed employed has the following composition:

TABLE V

| Component: | Weight per cent |
| --- | --- |
| Methyl propyl ketone | 2.4 |
| Methyl ethyl ketone | 6.2 |
| Acetone | 18.6 |
| Butyraldehyde | 1.3 |
| Propionaldehyde | 2.0 |
| Isobutyl alcohol | 1.8 |
| 1-propanol | 15.7 |
| Isopropyl alcohol | 2.8 |
| Ethanol | 32.3 |
| Methanol | 1.0 |
| Ethyl acetate | 0.5 |
| Water | 15.4 |

The above feed is charged to the column at the rate of 5,000 pounds per hour, the temperature at the feed plate being about 145° F. Within the column, the feed components are distributed in rather widely varying concentrations as shown from the table below.

TABLE VI

| Component, Weight Percent | Plate 10 | Plate 20 | Plate 30 | Plate 44 | Plate 54 |
| --- | --- | --- | --- | --- | --- |
| Methyl propyl ketone | 1.7 | 1.2 | 1.1 | 1.0 | 0.2 |
| Methyl ethyl ketone | 42.0 | 46.9 | 44.0 | 35.2 | 21.0 |
| Acetone | 0.9 | 0.8 | 0.9 | 6.8 | 29.5 |
| Butyraldehyde | 1.4 | 2.1 | 4.2 | 9.8 | 17.0 |
| Propionaldehyde | | | | 0.7 | 1.7 |
| Isobutyl alcohol | 0.5 | 0.5 | 0.8 | 1.2 | |
| 1-Proponaol | 5.2 | 4.8 | 4.8 | 3.8 | |
| Isopropyl alcohol | 2.3 | 1.7 | 1.6 | 0.9 | 0.3 |
| Ethanol | 34.3 | 29.1 | 27.8 | 23.3 | 10.4 |
| Methanol | 0.1 | 0.6 | 1.4 | 2.5 | 3.5 |
| Ethyl acetate | 0.3 | 0.5 | 1.9 | 5.0 | 10.6 |
| Water | 10.9 | 11.0 | 10.9 | 9.4 | 5.7 |

From plate 30 in stripping zone 8, a stream is withdrawn through line 10 at the rate of 1,020 pounds per hour and is returned to rectifying section 4 at plate 55 of column 2. The temperature at this point of return is 148° F. and the bottoms temperature is 184° F. In this regard it is to be pointed out that in processing certain mixtures the butyraldehyde concentration may be at its peak at a level slightly above the feed plate in which case the sidedraw may be effected through dotted line 11 located, for example, at the fifth plate above the feed tray. A stream is brought overhead through line 12 and condensed in cooler 14. Condensate is formed in this manner at the rate of about 24,280 pounds per hour of which 23,100 pounds per hour is returned as reflux to the column through line 16 while distillate is taken from the system through line 18 at the rate of 1,180 pounds per hour for further processing. This stream has the following composition:

TABLE VII

| Distillate components: | Weight per cent |
|---|---|
| Methyl ethyl ketone | 2.0 |
| Acetone | 76.6 |
| Butyraldehyde | 3.4 |
| Propionaldehyde | 8.6 |
| 1-propanol | 0.3 |
| Ethanol | 1.2 |
| Methanol | 4.5 |
| Ethyl acetate | 2.0 |
| Water | 1.4 |

The internal liquid reflux together with any unvaporized portion of the feed from line 6 passes down through stripping zone 8 in the lower portion of the column. The bottoms liquid cooled in the lower part of the column is withdrawn through line 20 at the rate of 3,820 pounds per hour and has the composition indicated below.

TABLE VIII

| Bottoms components: | Weight per cent |
|---|---|
| Methyl propyl ketone | 3.0 |
| Methyl ethyl ketone | 5.9 |
| Acetone | 1.5 |
| Butyraldehyde | 0.4 |
| Isobutyl alcohol | 2.2 |
| 1-propanol | 22.4 |
| Isopropyl alcohol | 3.8 |
| Ethanol | 40.9 |
| Methanol | .04 |
| Ethyl acetate | 0.2 |
| Water | 19.7 |

This stream, the composition of which is indicated immediately above, may be processed for recovery of the various components thereof, including spirit grade ethanol by means of any of several procedures outside the scope of my invention.

From the above data, it will be seen that a bottom stream containing ethanol was obtained which contained only .04 weight per cent of methanol, a concentration entirely satisfactory from the standpoint of spirit grade ethanol requirements. This low methanol concentration is reduced even further, of course, in the subsequent distillation step to recover the ethanol, as generally set forth above.

Figure 5:
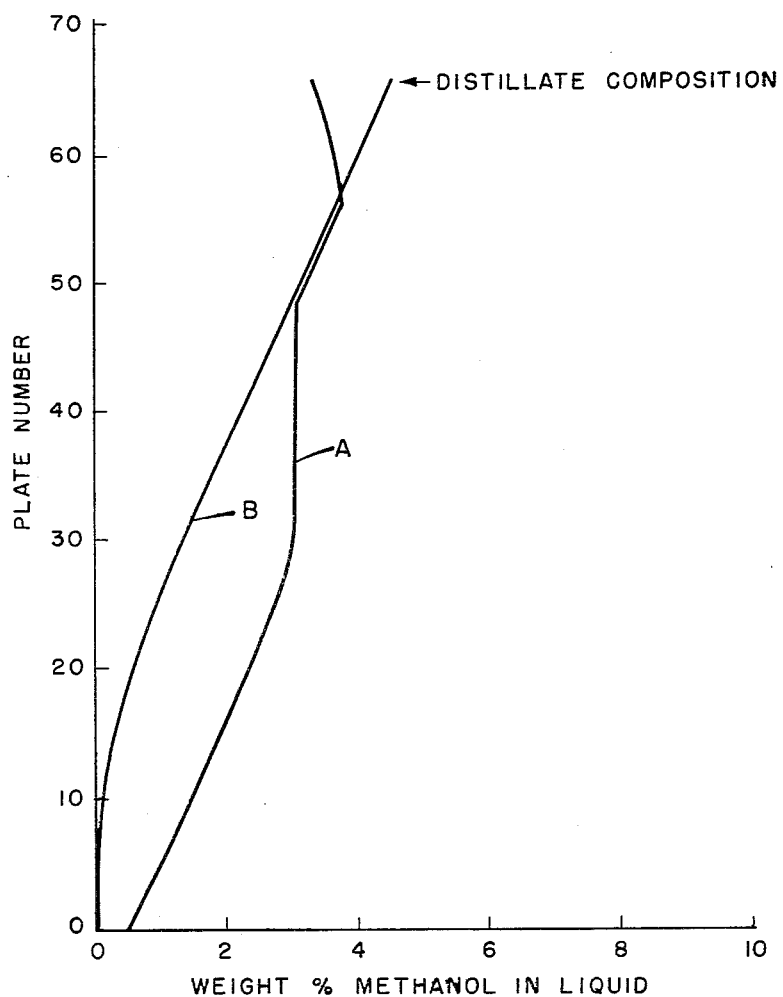

To demonstrate further the ability of the process of my invention to reduce the concentration of methanol in the ethanol-containing bottoms stream, Figure 5 is included showing a plot of the per cent methanol present at various levels throughout the column. Curve A shows the concentration of methanol at different levels in the column when employing the conditions described in Example 1, which curve B furnishes similar information based on data obtained from Example 2. Using the plate liquid compositions indicated in Table VI of Example 2 above, the vaporization equilibrium constant values (K) are calculated to be follows:

| Plate No. | 1 | 10 | 20 | 30 | 44 | 54 |
|---|---|---|---|---|---|---|
| $K_{MeOH}$ | 1.0 | 1.08 | 1.16 | 1.16 | 1.16 | 1.17 |

While these values indicate that the separation is difficult to make, the important point is that the constant has a value of one or greater in all sections of the column. The gradient (curve A) for conventional operation shows that the K for methanol is positive from the base of the column to about plate 25, then decreases to a value of one for the section covered by plate 30 to about plate 50, returns to its former value for the next 5 plates, then decreases to values below one as the distillate composition is approached. Removal and recycle of the sidedraw stream from plate 30 to plate 50, as taught by the process of my invention, results in a K that has a value always greater than one, which of course, is essential if a reasonably sharp separation is to be obtained.

I claim:

1. In a process for obtaining spirit grade ethanol from an aqueous mixture containing minor amounts of butyraldehyde, methanol and methyl ethyl ketone with respect to said ethanol, the steps which comprise introducing said mixture at an intermediate level in a distillation column having a stripping zone and a rectification zone, withdrawing liquid from a point in said column in the vicinity of said intermediate level, the quantity of said liquid withdrawn amounting to a minor portion of said aqueous mixture, returning said liquid to said rectification zone and above the level at which said liquid was withdrawn, maintaining the temperature within the column at the level where said liquid is returned thereto at a value of from about 144° to 150° F., and withdrawing a bottoms fraction from said column containing ethanol substantially free of methanol.

2. The process of claim 1 in which the quantity of said liquid withdrawn from the vicinity of said intermediate level does not exceed about 10 per cent of said aqueous mixture.

3. The process of claim 1 in which said liquid is withdrawn from a level in said column ranging from about 10 plates above to about 15 plates below said intermediate level.

4. In a process for obtaining spirit grade ethanol from an aqueous fraction produced in hydrocarbon synthesis involving the reduction of carbon monoxide with hydrogen in the presence of a fluidized iron catalyst, said fraction boiling from about 118° to about 215° F. and including butyraldehyde, ethanol, methyl ethyl ketone and methanol, the steps which comprise introducing said fraction at an intermediate level in a distillation column having a stripping zone and a rectification zone, withdrawing liquid from a point in said column ranging from about 10 plates above to approximately 15 plates below said intermediate level, the quantity of said liquid withdrawn amounting to not more than about 10 per cent of said aqueous fraction, returning said liquid to said rectification zone above the level at which said liquid was withdrawn, maintaining the temperature within the column at the level where said liquid is returned thereto at a value of from about 144° to about 150° F., and withdrawing a bottoms fraction containing ethanol substantially free of methanol.

5. The process of claim 4 in which said liquid is withdrawn from a point in said stripping zone corresponding to about 5 plates below said intermediate level and said liquid is returned to said rectification zone at a point approximately 5 plates above said intermediate level.

6. In a process for obtaining spirit grade ethanol from an aqueous mixture containing minor amounts of butyraldehyde, methanol and methyl ethyl ketone with respect to said ethanol, the steps which comprise introducing said mixture at an intermediate level in a distillation column having a stripping zone and a rectification zone, withdrawing liquid from a point in such stripping zone in the vicinity of said intermediate level, the quantity of said liquid withdrawn amounting to a minor portion of said aqueous mixture, returning said liquid to said rectification zone, maintaining the temperature within the column at the level where said liquid is returned there to at a value of from about 144° to 150° F., and withdrawing a bottoms fraction from said column containing ethanol substantially free of methanol.

References Cited in the file of this patent

UNITED STATES PATENTS

| 2,558,557 | Hess et al. | June 26, 1951 |
| 2,564,200 | Grekel | Aug. 14, 1951 |